Apr. 3, 1923.
J. R. KELLER
1,450,503
BOG PULVERIZER
Filed July 7, 1922
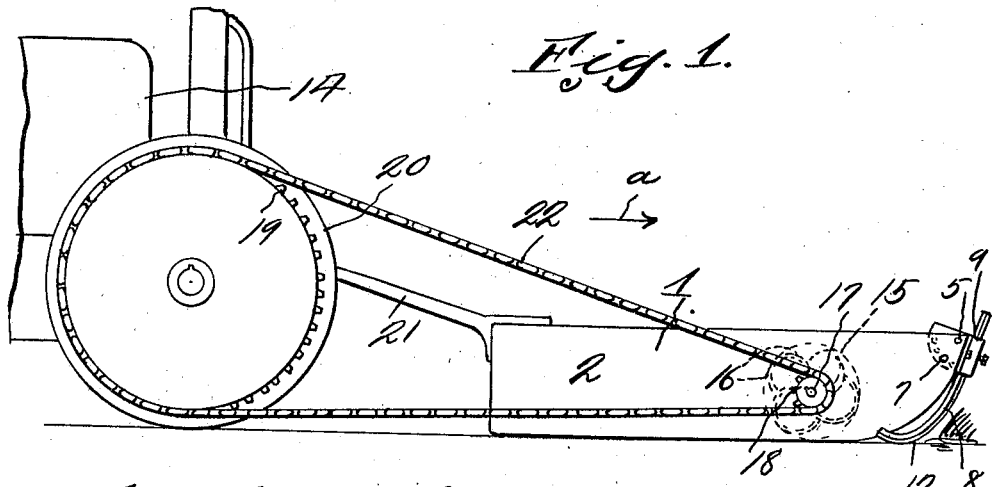
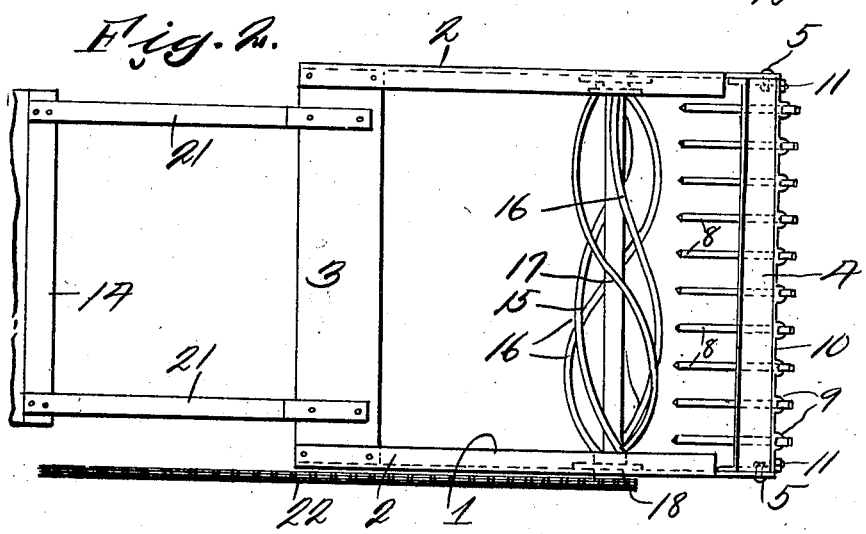
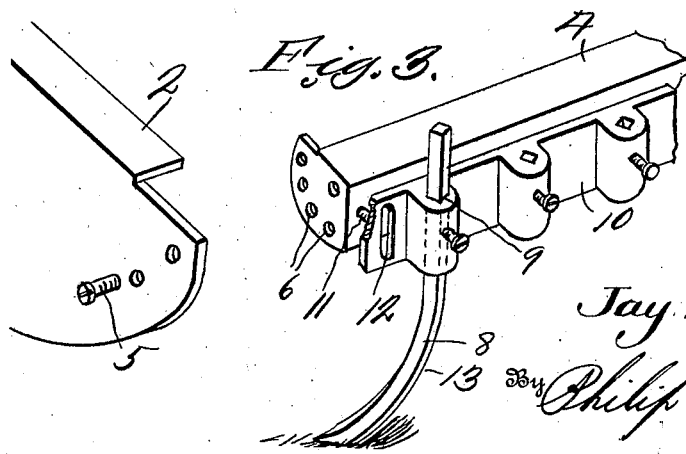
Inventor
Jay R. Keller
By Philip A. Ferrell
Attorney Patented Apr. 3, 1923.

1,450,503

UNITED STATES PATENT OFFICE.

JAY R. KELLER, OF ELIZABETH, NEBRASKA.

BOG PULVERIZER.

Application filed July 7, 1922. Serial No. 573,320.

*To all whom it may concern:*

Be it known that JAY R. KELLER, citizen of the United States, residing at Elizabeth, in the county of Cherry and State of Nebraska, has invented certain new and useful Improvements in Bog Pulverizers, of which the following is a specification, reference being had therein to the accompanying drawings.

The invention relates to pulverizers and has for its object to provide a machine of this character wherein tufts of grass roots and the like will be severed into sections by knives as the machine advances and then engaged by a rotatable scatterer whereby the roots, grass and dirt are scattered over the surface of the ground as the cutting and pulverizing operation is taking place.

A further object is to provide a pulverizing, cutting and scattering machine comprising a runner supported body adapted to be attached ahead of a tractor or the like and provided with downwardly and rearwardly severing knives, a rotatable scattering member located rearwardly of the severing knives, said scattering member being provided with sprocket and chain connections with one of the forward wheels of the tractor.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the pulverizer and scatterer showing the same attached to a portion of a tractor.

Figure 2 is a top plan view of the device.

Figure 3 is a collective detail view of one end of the cutter carrying bar and one end of one of the runners.

Referring to the drawing, the numeral 1 designates the pulverizer and scattering machine, which machine comprises spaced runners 2, which runners are connected together at their rear ends by a transversely disposed bar 3 and at their forward end by a transversely disposed knife carrying bar 4. The knife carrying bar is secured to the forward ends of the runners 2 by means of bolts 5, which bolts form pivotal points for the bar 4 whereby said bar may be in connection with the arcuately arranged apertures 6 and bolts 7 adjusted to various positions in a vertical longitudinal plane in such a manner that the downwardly and rearwardly extending knives 8 which are vertically adjustable in lugs 9 of the knife bar 10 to various angles in a vertical longitudinal plane. The knife carrying bar 10 is secured to the forward side of the knife bar 4 by means of bolts 11 which extend through elongated slots 12 in the ends of the bar 10, therefore it will be seen that the bar 10 as a whole may be adjusted upwardly and downwardly during the adjustment of the knives 8. The knives 8 have their cutting edges 13 forwardly disposed, therefore it will be seen that when the machine is forced forwardly in the direction of the arrow *a* by the tractor 14 that the knives 13 will sever the tufts of grass into strips and that as the strips pass rearwardly they will be taken up by the scattering member 15 located rearwardly of the knives, which scattering member is provided with a plurality of severing knives 16 and that said knives during the rotation of the scattering member 15 will sever the roots and scatter the same. The scattering member 15 is provided with a transversely disposed shaft 17 having bearings in the runners 2 and with a small sprocket 18, which sprocket is in turn connected to a large sprocket 19 carried by the tractor wheel 20, therefore it will be seen that the scatterer 15 will be rotated at a high rate of speed. By rotating the scatterer 15 at a high speed, it is obvious that the knives 16 will sever as well as scatter the material.

The machine 1 is connected to the tractor by rearwardly extending arms 21, however it is to be understood that the device may be attached to the tractor in any suitable manner.

From the above it will be seen that a bog pulverizer leveler and root and grass scatterer is provided, which is simple in construction, parts reduced to a minimum and that the scatterer 15 is operated from the traction wheel through a sprocket chain 22.

The invention having been set forth what is claimed as new and useful is:—

A pulverizer and scattering machine comprising a frame, a tooth bar at the forward end of said frame, means whereby said tooth bar may be adjusted in a vertical longitudinal plane, downwardly and rearwardly extending severing knives carried by said tooth bar, means whereby said severing knives may be adjusted upwardly and downwardly, a transversely disposed severing and scattering element located rearwardly of the knives and rotatably mounted in bearings of the frame, and sprocket and chain means whereby said scattering and severing element may be rotated at a high speed.

In testimony whereof I hereunto affix my signature.

JAY R. KELLER.